United States Patent [19]

Gruenberg

[11] 4,001,691
[45] Jan. 4, 1977

[54] COMMUNICATIONS RELAY SYSTEM

[76] Inventor: Elliot L. Gruenberg, 6040 Boulevard East, West New York, N.J. 07093

[22] Filed: Jan. 30, 1975

[21] Appl. No.: 545,623

[52] U.S. Cl. ............................ 325/14; 343/100 CS
[51] Int. Cl.[2] ........................................ H04B 7/14
[58] Field of Search .......................... 325/1, 3–5, 325/8, 11, 14, 50–56, 58, 65; 343/100 TD, 100 CS, 176, 178, 208

[56] References Cited

UNITED STATES PATENTS

| 3,166,749 | 1/1965 | Schelleng et al. ........... 343/100 TD |
| 3,305,864 | 2/1967 | Ghose ................................. 325/14 |
| 3,394,374 | 7/1968 | Weiss ........................ 343/100 TD |
| 3,452,356 | 6/1969 | Stoney ............................... 325/14 |
| 3,631,494 | 12/1971 | Gans ........................... 343/100 CS |
| 3,710,255 | 1/1973 | Gicca ................................ 325/14 |
| 3,757,335 | 9/1973 | Gruenberg ................. 343/100 TD |

Primary Examiner—Robert L. Griffin
Assistant Examiner—Jin F. Ng
Attorney, Agent, or Firm—Ernest F. Marmorek

[57] ABSTRACT

In an electronic system for use in a communication system wherein there is radiated a plurality of information carrying electromagnetic first signals each having a radiating source and each having a radiated electromagnetic first reference signal, a transponder operable for receiving all of the electromagnetic signals and for radiating in response thereto a plurality of information carrying electromagnetic second signals corresponding respectively in information content to the first signals and a plurality of electromagnetic second reference signals corresponding respectively to the first reference signals, the transponder comprising a plurality of first antenna means each having output means and each operable for receiving the first signals and the first reference signals and for producing in response thereto a set of corresponding transmission line signals at its output means, and transmission means coupled to the output means of all of the first antenna means and operable for producing from the sets of transmission line signals the second reference signals as well as the second signals, each of the second signals having a spatial electromagnetic power density distribution having a peak value in the direction of each of the sources except for the source for its corresponding first signal for sources angularly spaced apart with respect to said transponder.

14 Claims, 18 Drawing Figures

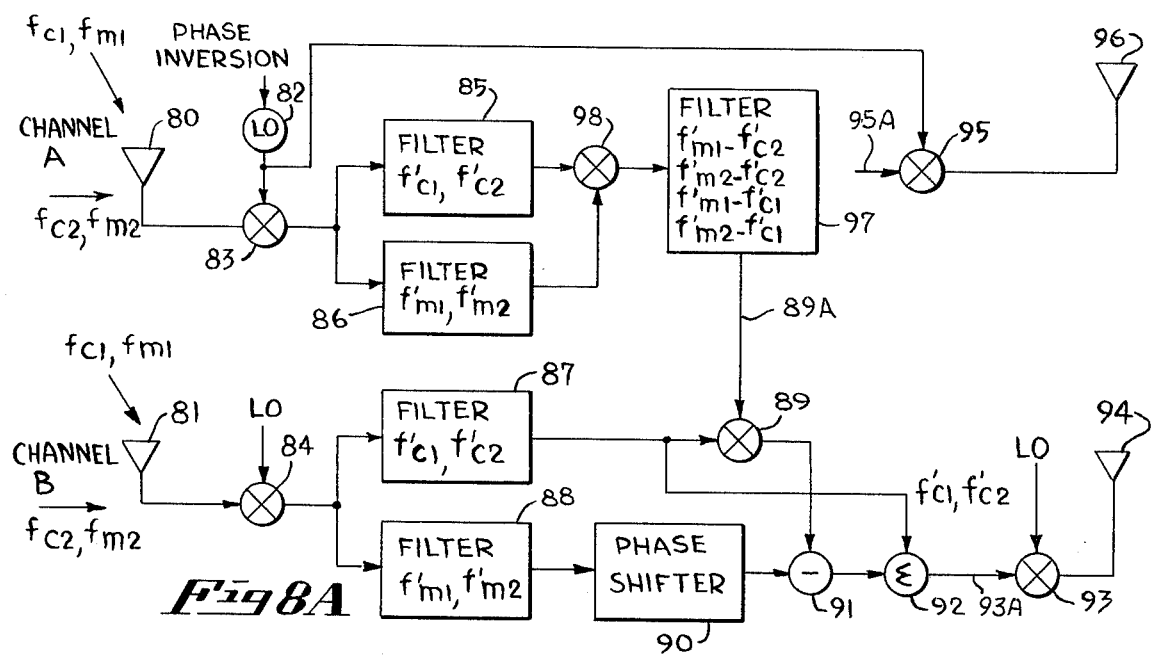
*Fig 8A*
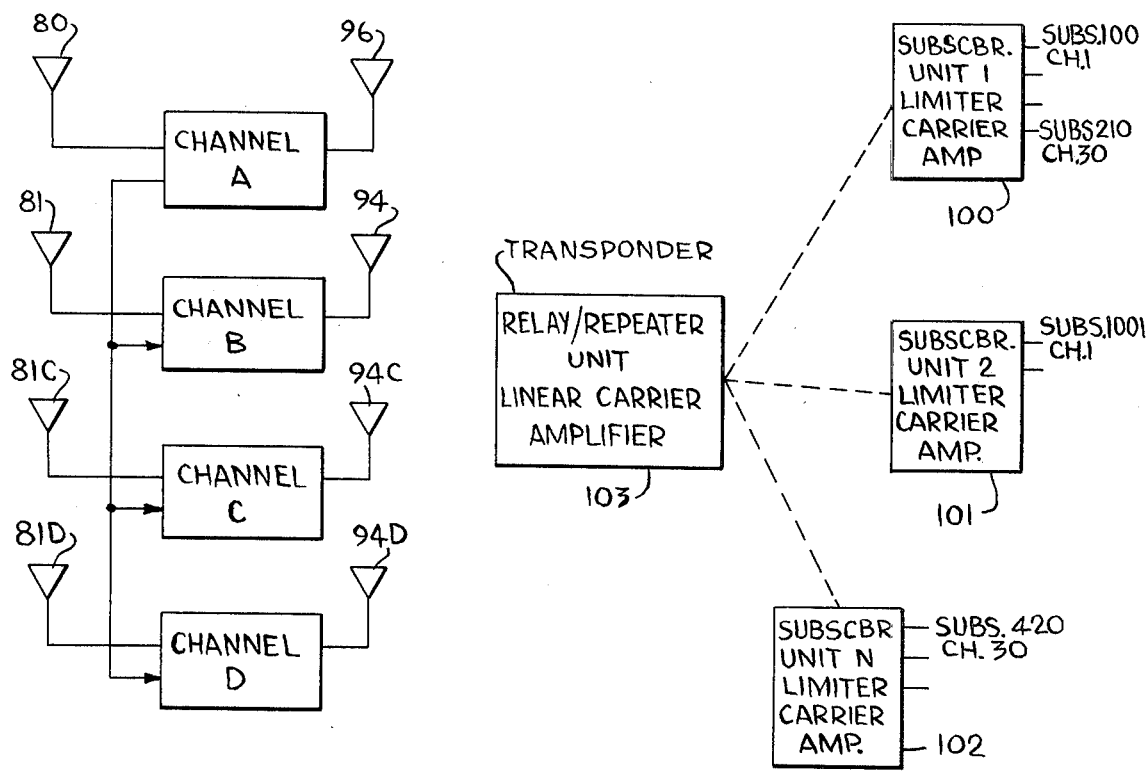
*Fig 8B*
*Fig 9*

MAIN TIMING DIAGRAM    RELAY/REPEATER    TRANSMITTED SIGNAL
0.1 MICROSECOND   CHANNELS  8 BINARY BIT   80 MBS RATE

* C-CARRIER ONLY
** M-MODULATION & CARRIER

COMMUNICATIONS RELAY SYSTEM

BACKGROUND OF THE INVENTION

The invention relates generally to a communication system comprising at least two communication terminals electromagnetically coupled to each other through a transponder and more particularly to communication terminals forming a closed loop oscillation for focusing the antenna arrays of the respective communication terminals.

Generally, it is known that two communication terminals each having an antenna array can be used to obtain a retrodirective oscillating loop for focusing the respective antenna arrays even for noise signals. In this connection, reference is had to applicant's U.S. Pat. No. 3,757,335 and his co-authored article "Self-Directional Microwave Communication System," IBM Journal of Research and Development, March 1974, pages 149 to 163.

Generally, a retrodirective oscillating loop between two communication terminals features the transfer of electromagnetic energy from communication terminal through space to the other communication terminal where the electromagnetic signal is amplified and retransmitted back to the first communication terminal where it is again amplified and retransmitted and this process continues indefinitely. If the total loop gain is greater than the total loop loss, there will be a build-up of signal even without the initial transmission of a carrier.

The build-up of signal or oscillation between the two retrodirective communication terminals may be seen from the following.

SIMPLIFIED DESCRIPTION

When a first communication terminal is first turned-on, there is a noise output from each of its antenna elements. The primary noise sources for the first antenna elements are independednt of each other so that the noise radiated by each of the first antenna elements is incoherent with respect to the noise from each of the other first antenna elements and the antenna array elements do not form a focused beam. Thus, a second communication terminal can be located within a relatively large angular region within which the first antenna array can focus. The noise signal received by the second communication terminal from the first communication terminal is amplified and retransmitted back to the first communication terminal. Assuming that the overall loop gain exceeds the overall loop loss and the system parameters are linear, there will be a build-up in the noise power in the loop until saturation of a system component ocurs.

The retrodirective closed loop communication system requires each of the communication terminals to be positioned within the angular range of focusing of the antenna array of the other communication terminal.

A communication system wherein the communication terminals are widely separated and are not line-of-sight, can avoid the use of additional power to compensate for over-the-horizon losses by the use of a transponder.

In the case of a retrodirective oscillating communication system, it is desirable to have a transponder which readily permits the respective communication terminals to develop the oscillating condition and which can provide a signal sorting for minimizing the interference between a plurality of communication terminals so as to increase the communication channel capacity within a given frequency band by optimizing the use of communication transponders.

SUMMARY OF THE INVENTION

One of the principle objects of the invention is to provide a communication system, particularly an oscillating loop type of communication system having a transponder for completing the communication loop between at least two communication terminals.

Another object of the present invention is to provide a communication system with a transponder including local oscillators for frequency shifting to prevent communications between communication terminals without the transponder.

Another object of the present invention is to provide a transponder for a communication system wherein the transponder selectively retransmits signals with a relatively reduced power density in a direction of the source of the signal being retransmitted for angularly spaced apart signal sources.

Further objects and advantages of the invention will be set forth in part in the following specification and in part will be obvious therefrom without being specifically referred to, the same realized and attained as pointed out in the claims hereof.

The invention accordingly comprises the features of construction, combination of elements and arrangement of parts which will be exemplified in a construction hereinafter set forth in the scope of the application of which will be indicated in the claims.

BRIEF DESCRIPTION OF THE DRAWINGS

For a full understanding of the nature and objects of the invention, references should be had to the following detailed description, taken in connection with the accompanying drawings, in which:

FIGS. 8A and 8B are block diagrams of a transponder according to the present invention;

FIG. 9 is a block diagram of a communication system according to the present invention;

DESCRIPTION OF THE PREFERRED EMBODIMENTS

In carrying the invention into effect, several embodiments have been selected for illustration in the accompanying drawings and for description in the specification.

Figure 1:
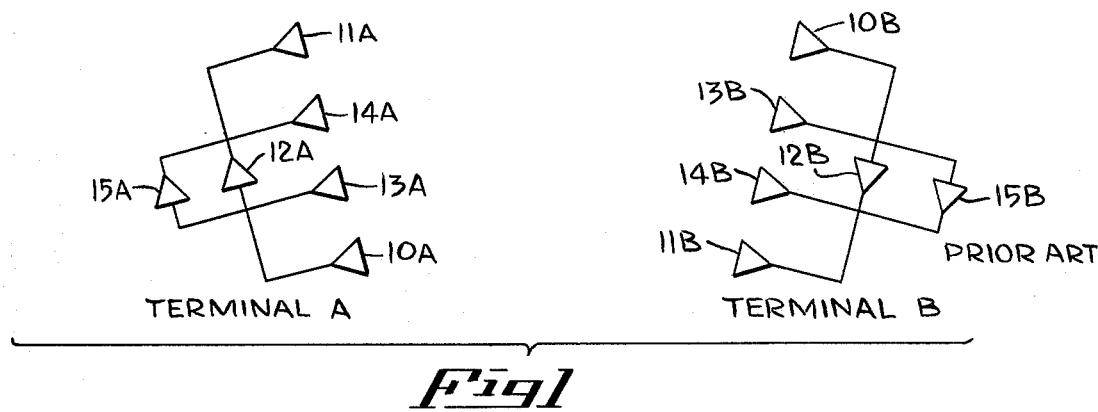
FIG. 1 is a simplified schematic drawing of two communication terminals forming a retrodirective oscillating loop.

FIG. 1 shows a basic schematic diagram of a retrodirective oscillating communication system between communicating terminals A and B. At terminal A, antenna element 10A is coupled to antenna element 11A through amplifier 12A through a given electrical length and antenna element 13A is coupled to antenna element 14A through amplifier 15A through the same electrical length. Thus, terminal A is retrodirective. Terminal B has elements 10B to 15B interconnected in a similar way as terminal A and is also retrodirective.

The operation of the retrodirective antenna arrays of terminals A and B is essentially as follows: When terminal A is turned-on, noise power generated by amplifiers 12A and 15A is radiated by antenna elements 10A, 11A, 13A, 14A. If terminals A and B are within their respective field of view, the noise power radiated by terminal A is received by antenna elements 13B and 10B, amplified by amplifiers 12B and 15B respectively, and then reradiated by antenna elements 11B and 14B. This amplified noise power is received by terminal A and reradiated back to terminal B. If the overall amplification of the loop defined by the propagation path between the terminals A and B and by the terminals A and B themselves is greater than the losses therein, the amplitude of the noise power increases and the original noise power is amplified until saturation at one or both of the terminals A and B occurs, at essentially a single frequency. This state has been called "singing" in the prior art. It is known that the antenna elements at the terminals can be arrayed in order to optimize the antenna gain and obtain a self-focusing or retrodirective antenna array.

Figure 2:
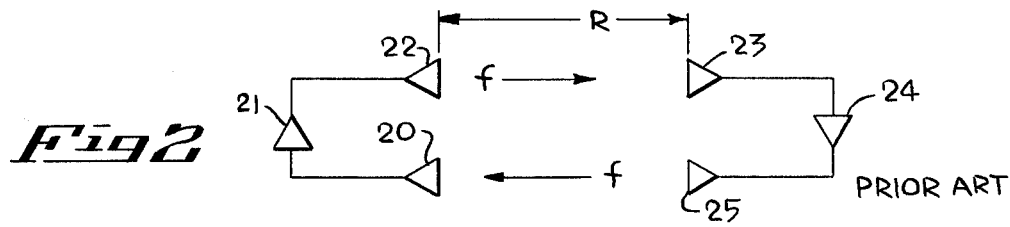
FIG. 2 is a simplified schematic drawing such as shown in FIG. 1 wherein the same frequency is received and transmitted by the two communication terminals.
Figure 3:
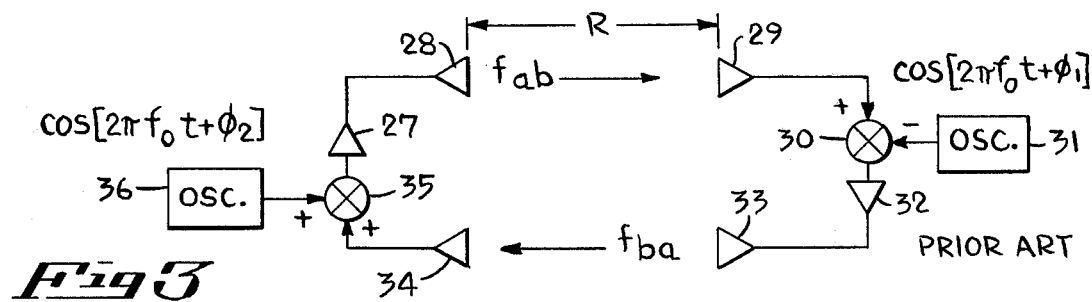
FIG. 3 is a simplified schematic drawing such as shown in FIG. 2 but different frequencies are used at each communication terminal for receiving and transmitting.
Figure 4:
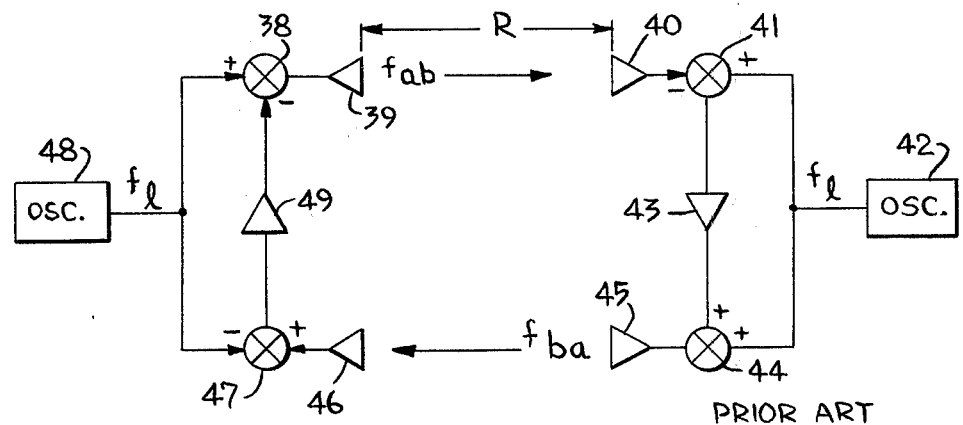
FIG. 4 is a simplified schematic drawing such as shown in FIG. 3 wherein the received signal is translated to an intermediate frequency.

FIGS. 2, 3, and 4 show schematic diagrams illustrating simplified retrodirective oscillating loops. FIG. 2 shows a communication system using a single frequency, $f$, for terminals separated by a distance R. A signal received by an antenna element 20 is amplified by an amplifier 21 and reradiated by an antenna element 23. The signal at the antenna element 23 is amplified by the amplifier 24 and reradiated by the antenna element 25. Thus, the signal is recirculated and amplified because the overall amplification exceeds the overall losses so that eventually signal saturation occurs somewhere in the communication system.

FIG. 3 shows a communication system wherein two different transmitting frequencies are employed. Of course, the receiving portion of each system must have a pass band for receiving the transmitting signal of the other station. Noise starting out at an amplifier 27 is radiated by an antenna element 28 to an antenna element 29. The signal is then coupled to a mixer 30 and mixed with a signal from a local oscillator 31. The output signal form a mixer 30 is coupled to an amplifier 32 and then radiated at frequency $f_{ba}$ by an antenna element 33 to an antenna element 34 where the signal is coupled to a mixer 35 and mixed with a local oscillator signal from a local oscillator 36. The output signal from a mixer 35 is amplified by an amplifier 27 and radiated by an antenna element 28 at frequency $f_{ab}$ to the antenna element 29. As in the communication system shown in FIG. 2, the signal here is recirculated and the overall amplification increases the amplitude of the signal until saturation occurs somewhere within the communication system.

FIG. 4 shows yet another simplified embodiment in which a received signal is frequency translated to an intermediate frequency for amplification and then is frequency translated back to the transmitting frequency. Signal noise produced by a mixer 38 is transmitted by an antenna element 39 and received by an antenna element 40 and coupled to a mixer 41 where it is mixed with a signal $f_1$ generated by a local oscillator 42. The intermediate frequency output signal from the mixer 41 is coupled to an amplifier 43 and then mixed in a mixer 44 with the signal from a local oscillator 42 to produce the signal at the frequency $f_{ba}$ which is transmitted by an antenna element 45 to an antenna element 46. The signal received by an antenna element 46 is coupled to a mixer 47 and mixed with the signal from a local oscillator 48. The intermediate frequency signal generated by a mixer 47 is coupled to an amplifier 49 and then mixed in a mixer 38 to generate a signal to be transmitted by an antenna element 39. The circulated signal increases in amplitude until saturation occurs within the communication system.

Figure 5:
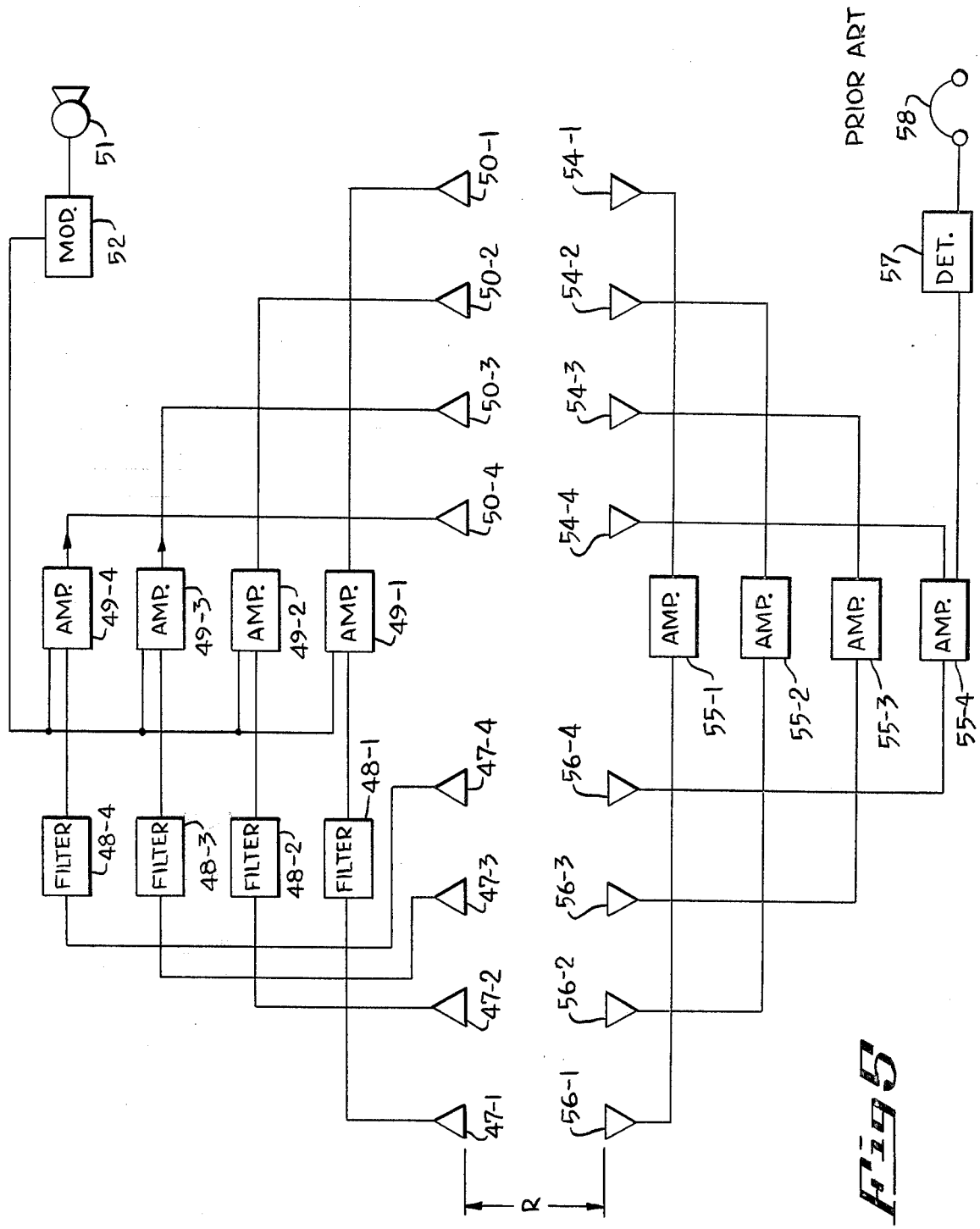
FIG. 5 is a simplified schematic drawing of a system similar to FIG. 1.

FIG. 5 shows a communication system wherein the two communication terminals are typical retrodirective antenna arrays. That is, in each antenna array the phase length between any two interconnected antenna elements is the same so that a signal received by the receiving antenna elements is reradiated by the radiating antenna elements with the main lobe of the radiated power in the direction of the source of the incident radiation. A signal received by antenna elements 47-1, 47-2, 47-3 and 47-4 are coupled respectively through filters 48-1, 48-2, 48-3 and 48-4 to modulating amplifiers 49-1, 49-2, 49-3, and 49-4 respectively. The output of the amplifiers 49-1, 49-2, 49-3, and 49-4 are coupled to antenna elements 50-1, 50-2, 50-3, and 50-4 respectively. A modulator 52 is coupled to amplifiers 49-1 to 49-4 and is operable for modulating the signal amplified by the respective amplifiers in accordance with an input audio signal at a microphone 51.

The filters 48-1 to 48-4 limit the frequency range for which the communication terminal can produce a retrodirective signal and therefore limits the frequency range for the occurrence of a retrodirective oscillating loop.

Antenna elements 54-1, 54-2, 54-3, and 54-4 receive a transmitted signal and couples it respectively to amplifiers 55-1, 55-2, 55-3, and 55-4 wherein the received signals are amplified. Amplifiers 55-1, 55-2, 55-3, and 55-4 are coupled respectively to antenna elements 56-1, 56-2, 56-3, and 56-4 for being radiated. The electrical phasing between the antenna elements 54-1 to 54-4 and 56-1 to 56-4 respectively is such that the respective radiated signals exhibit a main lobe in the direction of the respective source signal. The signal between the two antenna terminals circulates and increases its amplitude to some peak value determined by the saturation of a component in the communication system. Usually, a limiter is provided for this purpose to avoid overloading damage.

Figure 6:
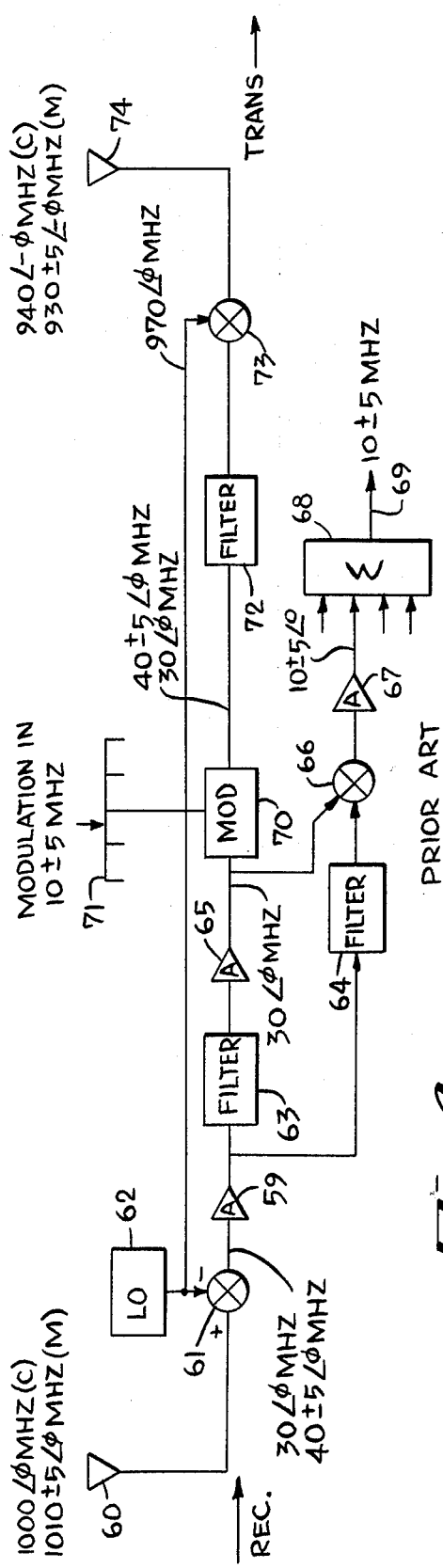
FIG. 6 is a simplified schematic drawing of a single channel showing a modulation system suitable for use in FIG. 5.

FIG. 6 shows one channel of a retrodirective communication terminal wherein modulation is carried out. A signal, typically a signal including a 1000 mHz carrier and a 10 mHz modulation band centered about 1005 mHz is received by an antenna element 60 and coupled to a mixer 61 where it is mixed with a signal from a local oscillator 62 to produce intermediate frequency (IF) signals at 30 mHz and at 40 ± 5 mHz. An amplifier 59 amplifies these IF signals and then couples them to filters 63 and 64 which have pass bands at 30 mHz and 40 ± 5 mHz respectively. An amplifier 65 amplifies the 30 mHz signal and couples it to a mixer 66 to produce an output signal at 10 ± mHz which is coupled to an amplifier 67 and then to a summing amplifier 68 to provide the modulation frequency output to the modem (not shown but coupled to line 69). The signal from the amplifier 65 is coupled to a modulator 70 for modulation from a signal coming in on line 71. The signal from the amplifier 65 is also coupled directly to a filter 72 which has a pass band for the two input signals. The signal from the filter 72 is coupled to a mixer 73 where it is mixed with the signal from the local oscillator 62 to produce two output signals, one at 940 mHz to serve as a carrier and another at 930 ± 5 mHz for the modulation band. These signals are radiated by an antenna element 74. It is convenient to adjust the local oscillator 62 to obtain a phase reversal of the transmitting signals with respect to received signals in order to obtain a retrodirective array.

Figure 7B:
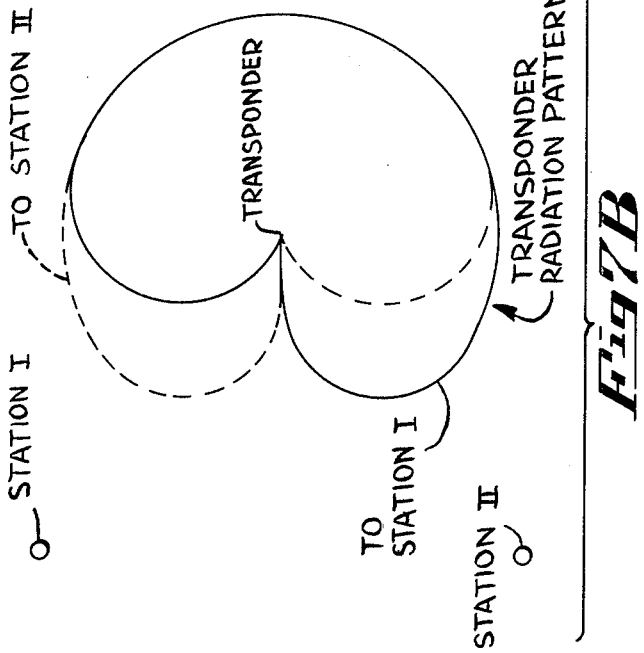
FIG. 7B is a diagram showing the operation the block diagram of FIG. 7A.
Figure 7A:
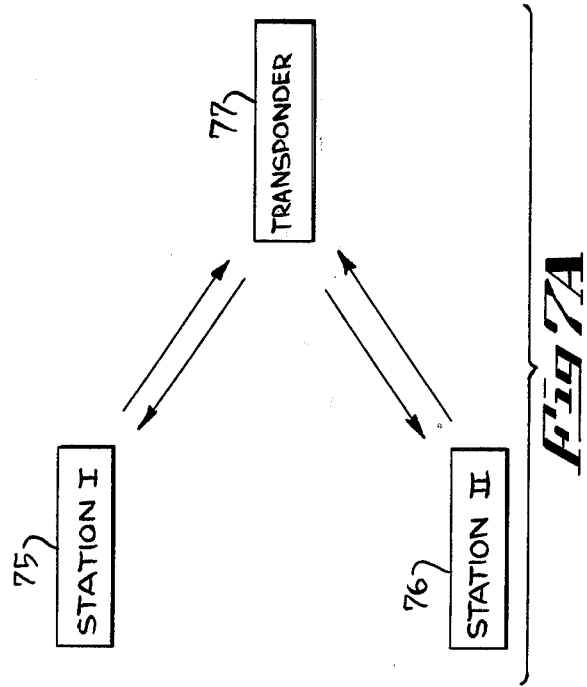
FIG. 7A is a block diagram of a retrodirective oscillating loop including a transponder according to the present invention.

FIG. 7A shows a general arrangement wherein a plurality of stations such as a station I 75 and a station II 76 communicate through transponder 77. In this arrangement, stations 75 and 76 can form a communicating loop with each other through the transponder 77 even with the four signals indicated in the FIG. 7A being at different frequencies. In fact, it may be desirable to select frequencies so that the stations 75 and 76 cannot form an oscillating loop directly.

Generally, the transponder 77 must be able to maintain the stations 75 and 76 within its so-called field of view. This suggests the use of broad beam antenna arrays for the transponder 77. It is particularly desirable to utilize the transponder 77 with an antenna system which will broadly radiate the signal from a station with a null or minimum signal level in the direction of that station.

The operation of the system shown in FIG. 7A may be better understood by considering the azimuthal electromagnetic radiation patterns generated at the transponder 77 in response to signals from Stations I and II as illustrated in FIG. 7B.

The radiation patterns I and II are for the respective modulation signals of Stations I and II and each pattern shows a relative null or spatial notch in the direction of the respective Stations I and II which initiates the transponder 77 to generate the transmittal modulation signal.

This mode of operation is called echo-less transponding and for angularly spaced stations, each station receives the modulation signal for all the other stations from the transponder and essentially does not receive its own modulation signal from the transponder. FIG. 8A shows a preferred embodiment for an echo-less transponder according to the invention.

The transponder 77 can be designed to be controlled remotely by a master station not shown. In this way, switching modes of operation for the transponder 77 need not require the presence of an operator at its location. This concept gives versatility to the possible sites for the transponder 77.

The remote master station can be designed to include a decision making network for passing a communication between subscribers by the first available channel within the transponder. Thus, each channel in the transponder can potentially serve many different subscribers on a first come first served basis and the transponder would determine if one of its channels are available for use.

FIG. 8A shows a block diagram for an echo-less transponder according to the present invention.

Typically, one communication terminal transmits a reference or carrier signal at a frequency $f_{c1}$ and modulation signal at a frequency $f_{m1}$ while another communication station radially spaced with respect to the transponder transmits a reference or carrier signal at a frequency $f_{c2}$ and a modulation signal at a frequency $f_{m2}$. The two carrier frequencies are essentially the same and the two modulation signals are within a predetermined modulation frequency band. The four signals are received by antenna elements 80 and 81. The signals received by the antenna element 80 are coupled to a mixer 83 and mixed with a local oscillator signal from a local oscillator 82 to produce intermediate frequency (IF) signals corresponding to the received signals shown in the FIG. 8 with "primes". A filter 85 selectively passes the signals at the frequency $f'_{c1}$ and $f'_{c2}$ and a filter 86 selectively passes the signals at the frequencies $f'_{m1}$ and and $f'_{m2}$. The filters 85 and 86 are coupled to a mixer 98 and dephased signals $(f'_{m2}-f'_{c2})$, $(f'_{m2}-f'_{c1})$, $(f'_{m1}-f'_{c2})$, and $(f'_{m1}-f'_{c1})$ are produced and passed through a filter 97. These dephased signals are used in other channels such as channel B to generate special signals for producing the echo-less transmission.

The signals received by an antenna element 81 are coupled to mixer 84 and mixed with a signal from the local oscillator 82 to produce intermediate frequency (IF) signals such as in the channel A. A filter 87 selectively passes the signals at frequency $f'_{c1}$ and $f'_{c2}$ while a filter 88 selectively passes the signals at frequency $f'_{m1}$ and $f'_{m2}$. The filter 87 is coupled to mixer 89 and mixed with the dephased signals from the filter 97 to produce a set of signals having the modulation of the signals of the frequency of $f_{m1}$ and $f_{m2}$ respectively but phased with respect to the antenna element 80 in accordance with the signals received by the antenna element 81. The signals from the filter 88 are coupled to a difference network 91 through a phase adjuster 90 and the output signals from mixer 89 are also coupled to the difference network 91. The phase adjuster 90 is for compensating for electrical phase differences due to the physical path differences of the various signals. The output signals from the difference network 91 are coupled to summer 92 along with the signal output of filter 87. The output from signal 93A summer 92 is coupled to mixer 93 and mixed with the local oscillator signal from the local oscillator 82. A signal 95 A analogous to signal 83 A but derived from filters 85, 86, and 97 is connected to mixer 95 and the ouput of the mixer 95 is coupled to an antenna element 96. The elements radiated signals at 94 and 96 combine in space to produce a radiation pattern having a relative null in the direction of the source of the modulation signal. The signal from the local oscillator 82 is selected to obtain a phase reversal for the signals to the antenna elements 94 and 96 in accordance with the usual practice so that a retrodirective array is obtained. Of course, it may be desirable in some cases not to have the echo-less transponder to be essentially retrodirective.

FIG. 8B shows a further embodiment of the invention shown in FIG. 8A. The corresponding elements in FIGS. 8A and 8B are identified in the same way. As indicated in FIG. 8B, additional channels can be used to increase the array size of the antennas and thereby form a narrow receiving and/or transmitting radiation pattern. Transmission line 89A of FIGS. 8A and 8B connects the output of the filter 97 to the mixers in channels C, D, etc. corresponding to mixer 89 in channel B.

FIG. 9 shows a system over view for a distribution communication system for a typical local area. Subscribers 100, 101 and 102 communicate with each other through a transponder 103 which serves as a relay and repeater. In this embodiment, the subscribers are assigned time slots with a typical main timing diagram for the channel distribution being shown in FIG. 10. Subscribers who are to communicate with each other are assigned a common time slot or channel such as subscriber 100 who communicates with subscriber 101 and is assigned channel 1.

When the subscriber 100 initiates a call, he causes the carrier channel in the subscriber unit 100 to be activated. This causes a carrier signal to develop in the subscriber unit 100 and the transponder 103. At the same time, radiation beams are directed between the subscriber station 100 and the transponder 103. Generally, it is convenient to have each subscriber unit equipped with a switch programmed to switch the carrier signal off for one second and then to switch it on for about 130 microseconds. If no calls to local subscribers are received during the switch on period, the switch can recycle until a call is finally received. Of course, when a call is in progress, the switch remains closed. Such a practice conserves the power required to maintain the transponder 103 in service.

The subscriber line being called, such as subscriber 101, has his channel activated by any received signal. The intensity of the received carrier signal is controlled by a limiter in the carrier channel of each subscriber station 100, 101 and 102 rather than in the transponder 103 so as to permit the transponder to remain linear over a wide amplitude range. The number of simultaneous subscriber units processed by the transponder 103 depends upon the type of signals used and the linearity of the equipment and other technical factors. In the present embodiment, it is considered desirable to have no more than ten simultaneous channels for the time sharing communication system. The time sharing is accomplished by the use of time multiplexing so that during a cycle of 125 microseconds, each subscriber will be using less than a maximum of 25 microseconds.

Figure 10A:
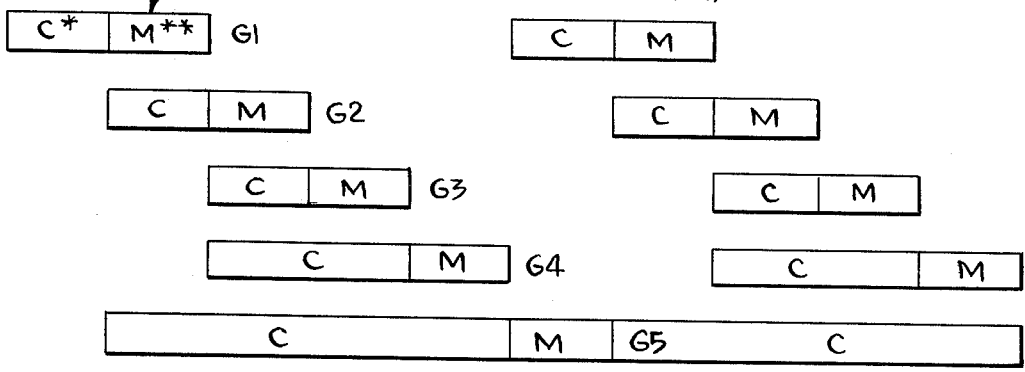
FIGS. 10A, 10B, and 10C are diagrams showing the time channel distribution for use in a communication system according to the present invention.
Figure 10A:
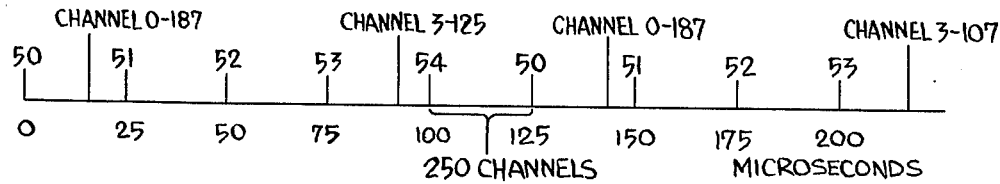

The time distribution for the various subscribers is variable and need not conform to FIG. 10a. Generally, subscriber stations which are relatively remote from the transponder 103, for example, more than 4.5 kilometers, can be transmitting continuously. These stations are assigned to group 5 and are designated with the highest numbered channels. Stations located between 2.3 and 4.5 kilometers are assigned to group 4 and are turned on 50 microseconds before channel time. Stations between 1.2 and 2.3 kilometers are assigned to group 3 and are turned on 25 microseconds before channel time. Stations closer than 1.2 kilometers are assigned to either group 1 or 2 and are turned on 25 microseconds before channel time.

Within each cycle time of 12.5 microseconds, each group will have its carrier signal turned off after an active channel time with the exception of group 5 which is trasmitting continuously.

Each group is assigned two 50 channel circuits at the minimum and the total number of channels can be readily increased to 4000 for a given transponder.

A typical channel includes frames of 8 bits each and occupying approximately 0.1 microseconds In this embodiment, the transponder 103 generates synchronizing pulses which are designated in FIG. 10a at 50, 51, 52, 53, and 54 and are received by all subscriber stations such as the stations 100, 101 and 102. The stations within a given group are responsive to only a particular synchronizing pulse. For example, the group 2 stations are synchronized by S1 and the channels of station group 5 will be synchronized by S4. These synchronous pulses are the time base for the respective channel slots.

Figure 10B:
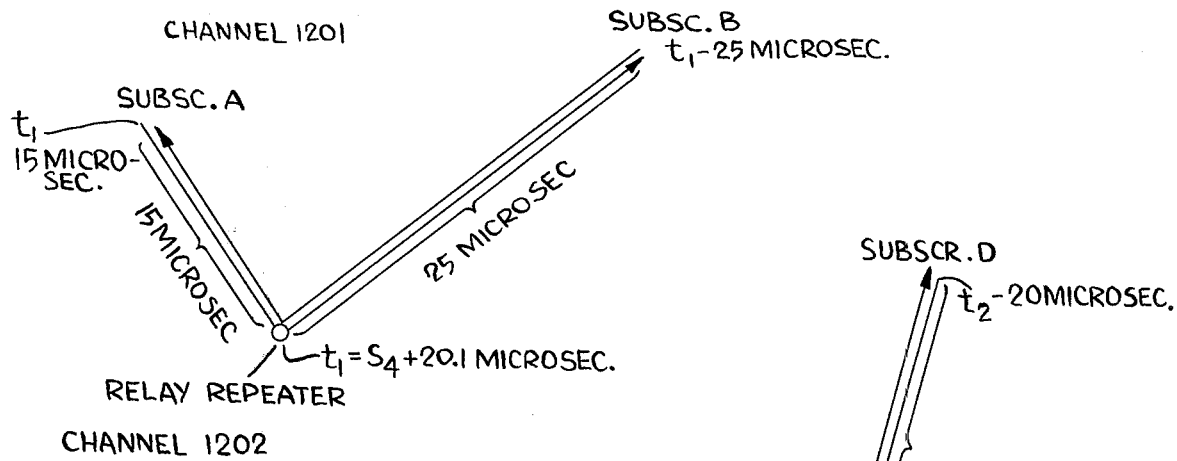
Figure 10C:
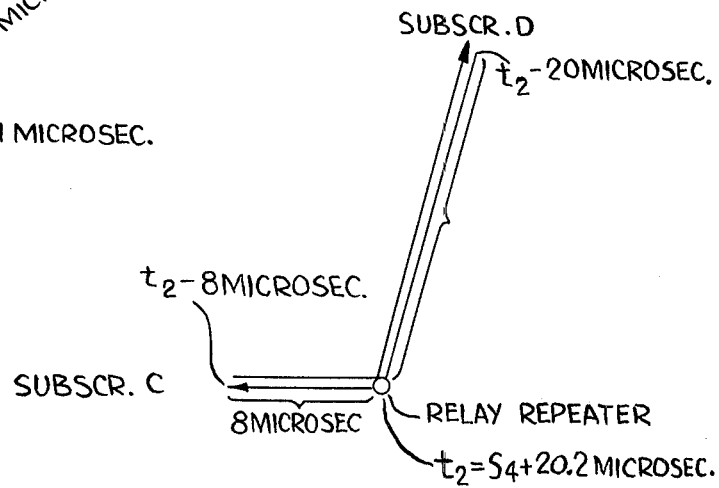

A typical communication interconnection for adjacent channel assignments is shown in FIGS. 10B and 10C for subscriber stations A and B. A channel 1201 occurs at a time $t_1$ equal to S4 plus 20.1 microseconds and has a duration of approximately 0.1 microseconds. A channel 1202 occurs at a time $t_2$ equal to S4 plus 20.2 microseconds with the same duration. A transmission from the subscriber station A must start at time $t_1$ minus 15 microseconds and that from subscriber station B must start at time $t_1$ minus 25 microseconds. The timing of the time gates of the respective subscriber stations must take this into account. Information is directed simultaneously to both of the stations A and B.

Similarly, the same occurs for another channel 1202 wherein a transmission from a subscriber station C starts at a time $t_2$ minus 8 microseconds and from a further subscriber station D at a time $t_2$ minus 20 microseconds. The transmitted information from subscriber stations C and D arrive at the transponder 102 simultaneously and is directed to the corresponding subscriber on two simultaneous beams with the transmission back to the originating subscriber B prevented by the transponder 103.

Generally, for a total of 50 stations having 10 subscribers in each station group and a level of service of approximately 10 percent, a probability based on the Poisson probability theory gives an average of three beams in use and a peak of about 10 channels in use.

Generally, the selection of frequencies for the operating bands can cover a wide range of frequencies and will depend, in practice, on what frequency bands are allocated by the government. Typically, a band from about 18,580 to about 18.680 gHz can be used from the transponder 103 and a band from about 18.700 to about 18.800 gHz can be used to the transponder 103. Doppler stability between subscriber stations can be improved by the use of an appropriate frequency shift between received frequency and transmitted frequency of each subscriber station as taught in the aforementioned U.S. Pat. No. 3,737,355.

Generally, the microwave power level for a transmission between a typical subscriber station 101 and the transponder 103 can be computed by standard methods. In the case of a separation of 5 kilometers, a transmitting antenna gain of about 40db and a receiving equivalent area of about 1m², a simplified calculation can be made as follows. A modulation band width of 100 mHz for a carrier signal frequency of about 18 gHz and a noise figure of about 15 db gives an expected signal-to-noise of about 35 db using the formula $$P_R = \frac{G\,A\,P_T}{4\,\pi\,R^2}$$

wherein $P_R$ is received power, $P_T$ is transmitted power, $G$ is transmitting antenna gain, $A$ is equivalent receiving aperture, $R$ is separating distance.

Instead of a time division channel, other ccommunication channels can be formed according to known communication techniques. A telephone service known as T1 is used to transmit 24 digitized voice channels over twisted wires at the rate of 1.544 Megabits per second. Independent frequency division channels spaced approximately 2 mHz apart may be used for the transmission of 24 voice channels between subscriber stations and conveniently link together digital telephone equipment at each subscriber station. In such a system, the transponder links subscribers without generating a synchronizing signal. Such a frequency division system is also very useful for mobile communications.

Figure 11:
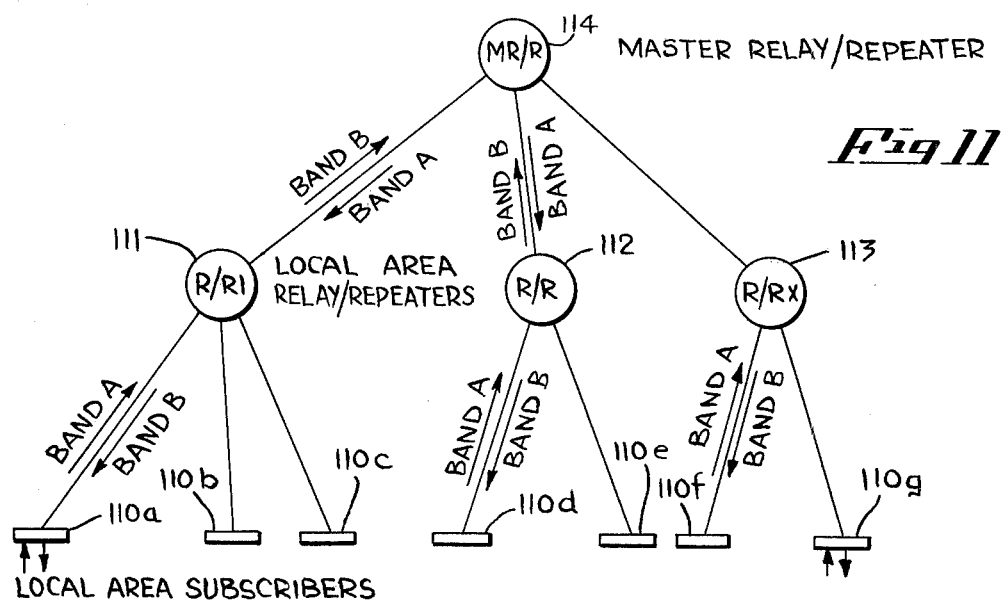
FIG. 11 is a block diagram of a communication system including a plurality of transponders according to the present invention.

FIG. 11 shows a complex communication system utilizing a master transponder and secondary transponders. Local subscribers 110a, 110b, and 110c transmit to secondary transponder 111, subscribers 110d and 110e transmit signals to secondary transponder 112, and subscribers 110f and 110g transmit signals to secondary transponder 113. The respective subscribers can only receive signals from the respective transponders which handle their signals. The secondary transponders 111, 112, and 113 communicate only with master transponder 114. All of the subscribers using the same secondary transponder are considered to be in the same local area and communicate with each other only through their secondary transponder. Communication of a subscriber in one local area to another local area follows a path from one secondary transponder to the master transponder and then to the other secondary transponder and back again. Thus, if subscriber 110b communicates with subscriber 110f, the signal path is from subscriber 110b to secondary transponder 111 to master transponder 114 to the secondary transponder 113 and finally to the subscriber 110f. The signal back follows the reverse path. This concept is clearly extendable to provide extensive local area communication within a local area and from one local area to a remote local area.

Local area subscribers are all assigned channels in Band A for uplink transmission and receive on channels in band B. Bands A and B are separated to provide isolation, typically band A may be 18,580 to 18,680 Ghz and band B may be 18,700 to 18,800 Ghz, to be consistent with the example given above. Transponders 111, 112, and 113 are local area stations and transmit on band B and receive on band A, the opposite of the local stations. Transponders 111, 112 and 113 are designed in accordance wtih FIG. 8b. These transponders can also communicate wih a master relay transponder 114. This transponder receives on band B and transmits on band A, and so it cannot receive directly from the local subscriber stations.

Figure 12:
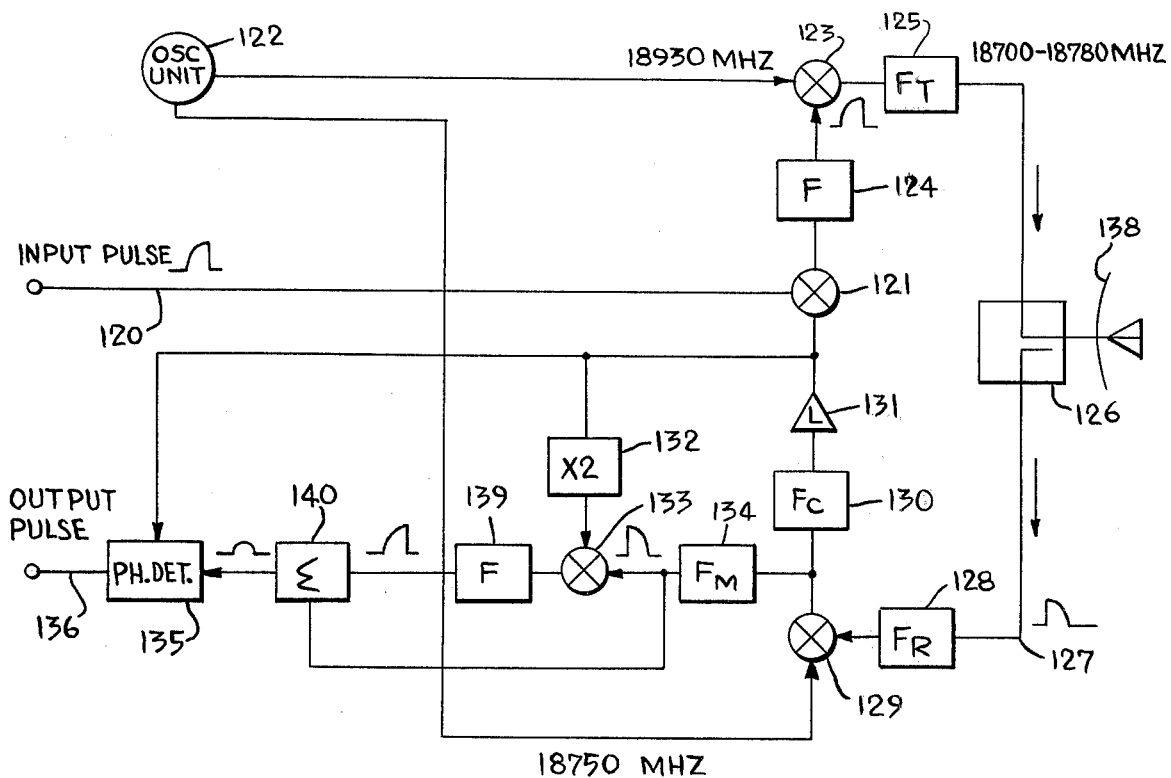
FIG. 12 is a block diagram of a portion of a subscriber station in a single side band (SSB) system according to the present invention.

FIG. 12 shows a block diagram of a portion of a subscriber station for use with single sideband (SSB). This circuit permits the use of a frequency spectrum about one half of the usual spectrum for pulse code modulation. Generally, a pulse having a frequency spectrum as shown near the input of line 120 is processed to give a frequency distribution as shown near mixer 123. This pulse is then transmitted.

A received signal has the frequency distribution as shown near line 127. The received pulse is frequency translated to an intermediate frequency signal while maintaining its frequency distribution integrity. A portion of the IF signal is mixed with twice the lowest IF signal frequency component and filter to obtain the lower signal or difference frequency signal. This difference frequency signal exhibits a frequency distribution opposite to the IF signal and in correspondence to the missing half of the incoming pulse. The summing of the IF signal and the difference frequency signal, properly adjusted for phase and amplitude balance gives the original pulse in its entirety.

The input from the modulator (not shown) is coupled by line 120 to mixer 121. A local oscillator 122 provides a local oscillator signal which is coupled to a mixer 123. The output signal of the mixer 121 passes through a filter 124 and is coupled to the mixer 123 and is mixed with the local oscillator signal to produce an output signal which is coupled to a filter 125 and then to a coupler 126 and an antenna element 138 which is shown here as a parabolic reflector type antenna but, of course, can be any other suitable antenna. The coupler 126 couples part of the microwave energy into transmission line 127 which couples into a filter 128 and then to a mixer 129. This signal is mixed with the local oscillator signal from the local oscillator 122 and produces an output signal which is filtered by a filter 130, amplified by an amplifier 131 and then coupled into the mixer 121. Part of the output signal from the amplifier 131 is coupled to a multiplying network 132 which doubles the frequency and then is coupled into a mixer 133. In addition, the output from the mixer 129 is selectively filtered by a filter 134 to give the IF signal version of the received signal and then is coupled into the mixer 133 to produce an output difference frequency signal which is filtered by filter 139 summed with the IF signal in summer 140 to give a reconstructed pulse which is coupled into a phase detector 135.

Figure 13:
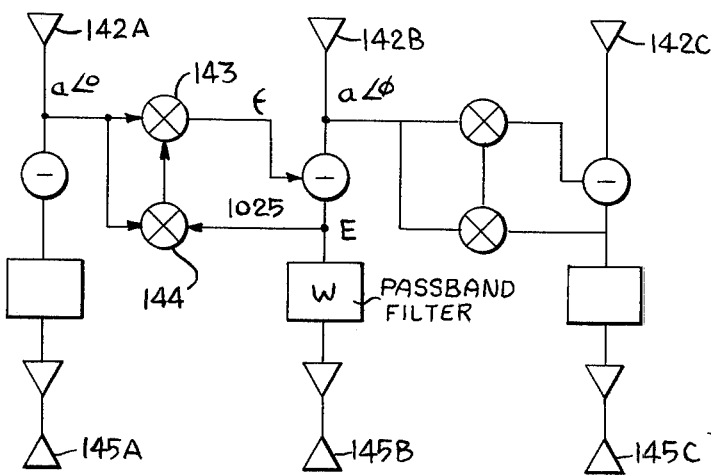
FIG. 13 is a block diagram of a system for use in the present invention.

FIG. 13 shows a block diagram suitable for use with an array for the instant invention. This block diagram provides an automatic reduction in signal strength for a strong signal received from any specific direction. A signal incident at antenna elements 142A, 142B and 142C produces signals with a phase difference between adjacent antennas of $\phi$ for uniformly spaced antenna elements. The signal for the antenna element 142A is coupled to mixers 143 and 144. The other input signal to the mixer 144 is in the circuit for the antenna element 142B. The output signal from mixer 144 is a signal at twice the frequency of the incoming signal and is coupled to the mixer 143 to produce a signal at the frequency of the incoming signal but having a phase difference $\epsilon$ and this phase difference corresponds to $\phi$. That is, the output signal from the mixer 143 is in phase with the signal from the antenna element 142B and both of these signals are coupled into difference network 146 to produce an output signal E. Essentially, the following formula holds:

$$E = a - E\, a^2$$

wherein $E$ is the output of a typical difference network and $a$ is the amplitude of the incident signal. By simple manipulation of the equation, it can be shown that the ratio of $E$ to $a$ is the following:

$$E/a = \frac{1}{1 + a^2}$$

so that as $a$ increases the transfer function of the circuit reduces the gain of the circuit.

Each signal has its own suppression factor dependent on its signal strength. That is, a large signal is attenuated more than a relatively weak signal and the attenuation of the large signal does not have any substantial effect on the weak signal or any other signal.

Figure 14:
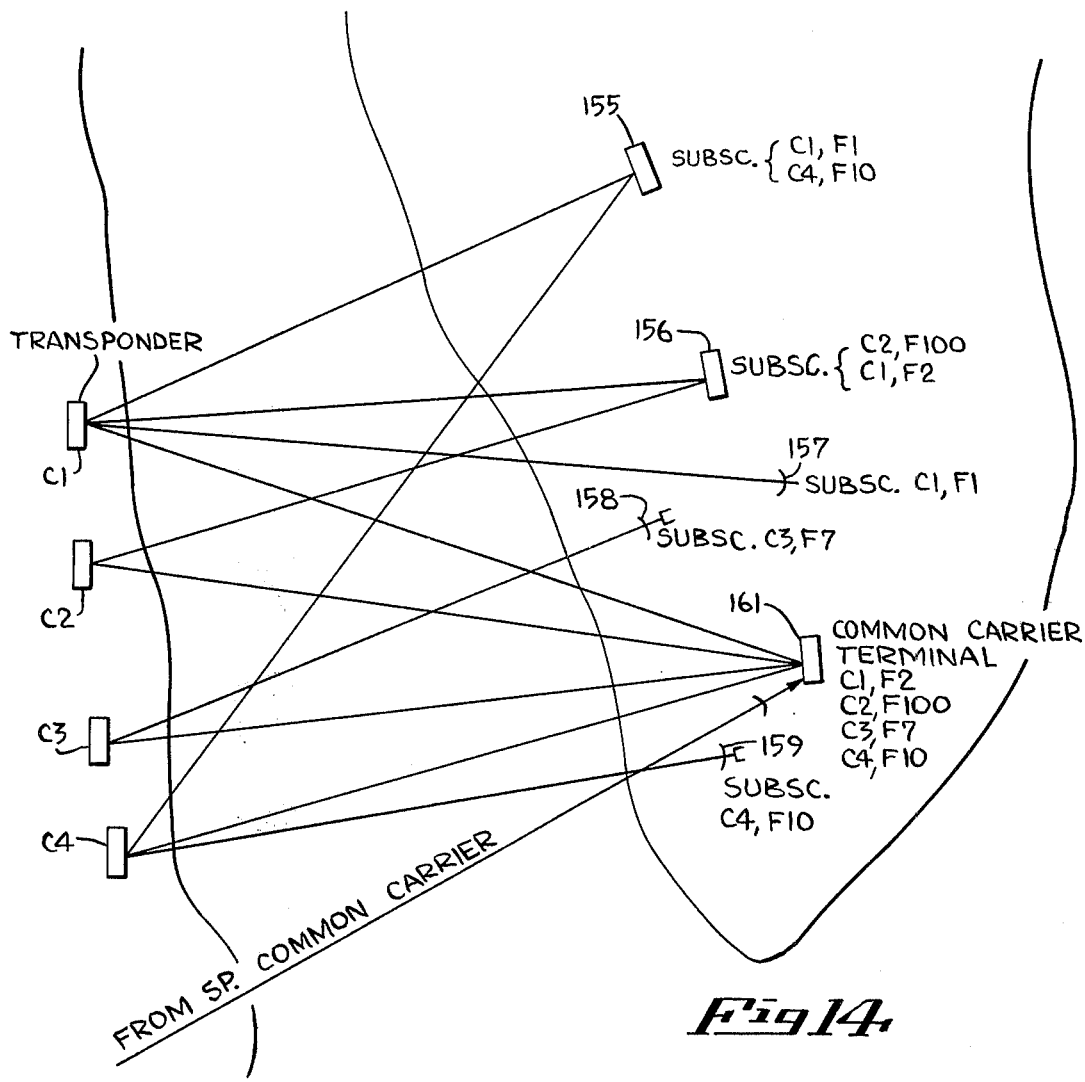
FIG. 14 is a diagram showing the parallel operation of the transponders according to the present invention.

A possible parallel operation of transponders is shown in FIG. 14. Typically, the various subscribers are assigned a transponder through which it can communicate with other subscribers and the frequency channel. Subscriber 155 has been assigned channels C1, F1 and C4, F10. The transponders are designated at C1, C2, C3, and C4. The subscriber 155 can communicate through transponder C1, at frequency channel F1, and through transponder C4 in frequency channel F10.

Subscriber 156 is herein shown to be assigned C2, F100 and C1, F2. The subscribers 155 and 156 both use transponder C1 but cannot communicate with each other as they do not have a common frequency channel. Subscribers 157, 158 and 159 are representative of simple types of subscribers having a single allocated frequency channel. As indicated, a subscriber 157 has been allocated C1, F1, a subscriber 158 has been allocated C3, F7, and the subscriber 159 has been allocated C4, F10. The subscriber 161 is a more complex subscriber and is a typical common carrier terminal here shown to have allocated C1, F2; C2, F100; C3, F7; and C4, F10.

The subscriber 155 can communicate through transponder C1 to the subscriber 157 and through the transponder C4 to the subscriber 161. Such a mixture of transponders and subscriber terminals illustrates the versatility in the uses of the herein disclosed invention for providing different types of services for different types of communication usage. Through this arrangement, a subscriber has a possibility of access to a number of subscriber channels which equal the number of transponders times the number of subscriber channels. It is understood that although the description here has been given with regard to the use of frequency channels, time channels, or some other type of allocation of intelligence can be utilized. It is further understood that the relative position of the transponder should be such that the mutual interference between them is minimized.

I wish it to be understood that I do not desire to be limited to the exact details shown and described herein, for obvious modifications will occur to a person skilled in the art.

Having thus described the invention, what I claim as new and desire to be secured by Letters Patent, is as follows:

1. In an electronic system for use in a communication system wherein there is radiated a plurality of information carrying electromagnetic first signals each having a radiating source and each having a radiated electromagnetic first reference signal, a transponder operative for receiving all of said electromagnetic signals and for radiating in response thereto a plurality of information carrying electromagnetic second signals corresponding respectively in information content to said first signals and a plurality of electromagnetic second reference signals corresponding respectively to said first reference signals, said transponder comprising, in combination:

a plurality of first antenna means each having output means and each operative for receiving said first signals and said first reference signals and for producing in response thereto a set of corresponding transmission line signals at its output means, and transmission means coupled to the output means of all of said first antenna means and operative for producing from said set of transmission line signals said second reference signals as well as said second signals, each of said second signals having a spatial electromagnetic power density distribution having a peak value in the direction of each of said sources except for the source for its corresponding first signal for sources angularly spaced apart with respect to said transponder.

2. The system as claimed in claim 1, wherein there are at least three first antenna means, and said transmission means comprises dephasing means coupled to the output means of one of said first antenna means and operative for producing from said set of said transmission line signals from said one of said first antenna means a plurality of dephased signals corresponding in information content respectively to said first signals, each of said dephased signals having an electrical phase substantially independent of the position of the radiating source of its corresponding first signal, and processing means coupled to said dephasing means and the other of said first antenna means and operative for receiving said dephased signals and said respective set of transmission line signals and for producing said second signals.

3. The system as claimed in claim 1, wherein there are a plurality of transponders and each transponder has a set of communication channels responsive to incident electromagnetic signals for producing said second signals, one of said transponders having a set of communication channels being different from the other sets, whereby said one of said transponders is operative for a predetermined electromagnetic signal for producing said second signals and the other of said transponders is non-operative.

4. The system as claimed in claim 1, wherein each first reference signal is radiated from a respective communication terminal operative to form a retrodirective oscillating loop with said transponder for each of said first reference signals.

5. The system as claimed in claim 1, further comprising a single sideband (SSB) sub-system having a pulse source for generating pulse signals to be transmitted, said SSB sub-system comprising
- first filter means operative for substantially attenuating a predetermined portion of each pulse signal before it is to be transmitted, whereby a substantial reduction is bandwidth is obtained;
- first frequency translation means operative for translating the frequency band of a first pulse signal to one side of a predetermined frequency as considered in the frequency domain, to produce thereby a second pulse signal;
- second frequency translation means operative for translating the frequency band of said first pulse signal to the other side of said predetermined frequency and in a reversed frequency distribution to produce thereby a third pulse; and
- summing means coupled to said first and said second frequency translation means and operative for summing said second and said third pulse signals to produce thereby a fourth pulse signal substantially similar in frequency signal components to said first pulse signal.

6. The system as claimed in claim 5, wherein said first frequency translation means comprises generator means operative for generating a first sub-system signal substantially at said predetermined frequency and said second frequency translation means comprises a frequency doubler means coupled to said generator means and operative for producing a second sub-system signal having a frequency twice said predetermined frequency.

7. The system as claimed in claim 1, including a signal suppression means operative for combining a first and a second transmission line signal to produce a third transmission line signal having an amplitude suppression factor dependent on the amplitude of said first transmission signal, said first and said second transmission line signals having the same predetermined frequency and having substantially the same amplitude.

8. The system as claimed in claim 7, wherein said suppression means comprises
- a first mixer means coupled to said first and said third transmission line signals and operative for producing an output signal having a frequency equal to twice said predetermined frequency;
- a second mixer means coupled to said first transmission line signal and said output signal of said first mixer and operative for producing an output signal having the same frequency as said predetermined frequency; and
- a difference network means coupled to said output signal of said second mixer means and said second transmission line signal and operative for producing thereby said third transmission line signal having an amplitude of substantially $a - Ea^2$, wherein E is equal to the amplitude of said third transmission line, and $a$ is the amplitude of said second transmission line signal.

9. The system as claimed in claim 7, wherein said signal suppression means is operative for producing said amplitude suppression factor for any one of said transmission line signals and said amplitude suppression factor has substantially no effect on the other transmission line signals.

10. The system as claimed in claim 1, wherein there are at least three first antenna means and said transmission means comprises a sub-system for each of said first antenna means and coupled thereto,
- one of said sub-systems comprising dephasing means operative for producing a plurality of dephased signals correponding respectively to said first signals, each of said dephased signals having a phase substantially independent of the position of the respective radiating source,
- said transmission means further comprising first coupling means operative for coupling said dephasing means to each of said other sub-systems, and
- a plurality of second antenna means coupled respectively to each of said sub-systems for radiating said second signals.

11. The system as claimed in claim 10, wherein said first antenna means have a given spatial arrangement relative to each other,
- said system further comprising a first local oscillator operative for generating a third signal, and
- each of said first antenna means further comprising first mixer means coupled to said first local oscillator and operative for producing said transmission line signals at a frequency shifted from the frequency of said first signals by the frequency of said third signal.

12. The system as claimed in claim 11, further comprising phase inverting means coupled to said transmission line signals and operable to phase invert with respect to said first signals.

13. The system as claimed in claim 12, wherein said transmission means further comprises a second local oscillator operable for generating a fourth signal, each of said sub-systems comprising second mixer means coupled to said second local oscillator for producing said second signals.

14. The system as claimed in claim 13, wherein each of said sub-systems further comprises a reference filter operable for selectively passing said first reference signal and an information filter operable for selectively passing said first signals, reference signal means coupled to said dephasing means and one of said first antenna means and operable for producing from said dephased signals and a set of transmission line signals and reference signals corresponding respectively to said first signals, each of said reference signals having a phase with respect to its respective first signal substantially independent of the position of its respective source, subtracting means coupled to each of the other first antenna means and said reference signal means and operable for producing differential signals, and second coupling means operative for coupling each of said subtracting means to its second mixer means.

* * * * *